(12) United States Patent
Wöhlte et al.

(10) Patent No.: US 11,714,164 B2
(45) Date of Patent: *Aug. 1, 2023

(54) VEHICLE RADAR SYSTEM WITH T-SHAPED SLOT ANTENNAS

(71) Applicant: Magna Electronics Inc., Auburn Hills, MI (US)

(72) Inventors: Wilhelm Johann Wolfgang Wöhlte, Sailauf (DE); Fabrizio Gentili, Aschaffenburg (DE)

(73) Assignee: Magna Electronics Inc., Auburn Hills, MI (US)

( * ) Notice: Subject to any disclaimer, the term of this patent is extended or adjusted under 35 U.S.C. 154(b) by 1 day.

This patent is subject to a terminal disclaimer.

(21) Appl. No.: 17/643,876

(22) Filed: Dec. 13, 2021

(65) Prior Publication Data

US 2022/0099793 A1   Mar. 31, 2022

Related U.S. Application Data

(63) Continuation of application No. 16/280,278, filed on Feb. 20, 2019, now Pat. No. 11,199,611.

(Continued)

(51) Int. Cl.
*G01S 7/03* (2006.01)
*G01S 13/931* (2020.01)
*H01Q 13/10* (2006.01)
*H01Q 1/32* (2006.01)
*B60Q 9/00* (2006.01)

(Continued)

(52) U.S. Cl.
CPC .............. *G01S 7/032* (2013.01); *G01S 7/03* (2013.01); *G01S 13/931* (2013.01); *H01Q 1/3233* (2013.01); *H01Q 1/3283* (2013.01);

*H01Q 13/10* (2013.01); *B60Q 9/00* (2013.01); *G01S 13/87* (2013.01); *G01S 2013/93271* (2020.01);

(Continued)

(58) Field of Classification Search
CPC .......... G01S 7/032; G01S 7/03; G01S 13/931; G01S 2013/93275; G01S 2013/93271; G01S 13/87; H01Q 1/3233; H01Q 1/3283; H01Q 13/10; B60Q 9/00; G05D 1/0257

See application file for complete search history.

(56) References Cited

U.S. PATENT DOCUMENTS 3,503,073 A * 3/1970 Ajioka ................... H01Q 25/04
342/371
3,696,433 A * 10/1972 Killion ................... H01Q 13/22
333/237

(Continued)

*Primary Examiner* — Peter M Bythrow
(74) *Attorney, Agent, or Firm* — Honigman LLP

(57) ABSTRACT

A vehicular radar sensing system includes a radar sensor configured to be disposed at a vehicle. The radar sensor includes a plurality of antennas that include a plurality of transmitting antennas that transmit radio signals and a plurality of receiving antennas that receive radio signals. The radar sensor provides radar data to a processor that processes the provided radar data to detect an object present in the field of sensing of the radar sensor. At least some antennas of the plurality of antennas include waveguides having T-shaped slots, with each T-shaped slot having a longitudinal portion and a transverse portion that extends transverse from the longitudinal portion, and with a width of the transverse portion being less than a length of the longitudinal portion.

20 Claims, 12 Drawing Sheets

Related U.S. Application Data

(60) Provisional application No. 62/632,695, filed on Feb. 20, 2018.

(51) Int. Cl.
  *G05D 1/02* (2020.01)
  *G01S 13/87* (2006.01)

(52) U.S. Cl.
  CPC .. *G01S 2013/93275* (2020.01); *G05D 1/0257* (2013.01)

(56) References Cited

U.S. PATENT DOCUMENTS

| | | | |
|---|---|---|---|
| 3,936,836 A * | 2/1976 | Wheeler | H01Q 21/0062 343/771 |
| 3,969,730 A * | 7/1976 | Fuchser | H01Q 1/42 343/770 |
| 4,164,742 A * | 8/1979 | Nemit | H01Q 25/02 343/768 |
| 4,247,858 A * | 1/1981 | Eichweber | H01Q 21/20 343/729 |
| 4,373,162 A * | 2/1983 | Peterson | H01Q 3/26 343/771 |
| 4,489,328 A * | 12/1984 | Gears | H01Q 19/005 343/770 |
| 4,513,291 A * | 4/1985 | Drabowitch | H01Q 21/0043 343/771 |
| 4,644,343 A * | 2/1987 | Schneider | H01Q 21/0043 343/771 |
| 4,821,044 A * | 4/1989 | Kurtz | H01Q 21/005 343/771 |
| 4,845,506 A * | 7/1989 | Shibata | G01S 13/60 343/717 |
| 4,916,458 A * | 4/1990 | Goto | H01Q 21/005 343/770 |
| 4,939,527 A * | 7/1990 | Lamberty | H01Q 21/061 343/754 |
| 5,008,678 A * | 4/1991 | Herman | G01S 13/931 342/158 |
| 5,404,146 A * | 4/1995 | Rutledge | H01Q 13/10 343/770 |
| 5,467,072 A | 11/1995 | Michael | |
| 5,596,337 A * | 1/1997 | Merenda | H01Q 21/08 343/770 |
| 5,638,079 A * | 6/1997 | Kastner | H01Q 21/005 343/768 |
| 5,657,023 A | 8/1997 | Lewis et al. | |
| 5,757,329 A * | 5/1998 | Hoover | H01Q 21/005 343/770 |
| 6,445,354 B1 * | 9/2002 | Kunysz | H01P 1/2005 343/895 |
| 6,507,321 B2 * | 1/2003 | Oberschmidt | H01Q 13/106 343/770 |
| 6,587,186 B2 | 7/2003 | Bamji et al. | |
| 6,642,908 B2 * | 11/2003 | Pleva | G01S 7/0232 343/876 |
| 6,674,895 B2 | 1/2004 | Rafii et al. | |
| 6,678,039 B2 | 1/2004 | Charbon | |
| 6,690,354 B2 | 2/2004 | Sze | |
| 6,710,770 B2 | 3/2004 | Tomasi et al. | |
| 6,825,455 B1 | 11/2004 | Schwarte | |
| 6,876,775 B2 | 4/2005 | Torunoglu | |
| 6,906,793 B2 | 6/2005 | Bamji et al. | |
| 6,919,549 B2 | 7/2005 | Bamji et al. | |
| 6,977,621 B2 * | 12/2005 | Kelly | H01Q 1/3275 343/770 |
| 7,053,357 B2 | 5/2006 | Schwarte | |
| 7,071,890 B2 * | 7/2006 | Tanaka | H01Q 21/005 343/756 |
| 7,157,685 B2 | 1/2007 | Bamji et al. | |
| 7,176,438 B2 | 2/2007 | Bamji et al. | |
| 7,203,356 B2 | 4/2007 | Gokturk et al. | |
| 7,212,663 B2 | 5/2007 | Tomasi | |
| 7,283,213 B2 | 10/2007 | O'Connor et al. | |
| 7,310,431 B2 | 12/2007 | Gokturk et al. | |
| 7,321,111 B2 | 1/2008 | Bamji et al. | |
| 7,340,077 B2 | 3/2008 | Gokturk et al. | |
| 7,352,454 B2 | 4/2008 | Bamji et al. | |
| 7,375,803 B1 | 5/2008 | Bamji | |
| 7,379,100 B2 | 5/2008 | Gokturk et al. | |
| 7,379,163 B2 | 5/2008 | Rafii et al. | |
| 7,405,812 B1 | 7/2008 | Bamji | |
| 7,408,627 B2 | 8/2008 | Bamji et al. | |
| 7,656,359 B2 * | 2/2010 | Haziza | H01Q 13/00 343/786 |
| 8,013,780 B2 | 9/2011 | Lynam | |
| 8,027,029 B2 | 9/2011 | Lu et al. | |
| 8,134,514 B2 * | 3/2012 | Yamaguchi | H01Q 21/005 343/770 |
| 8,149,177 B1 * | 4/2012 | Callus | H01Q 21/005 343/705 |
| 8,665,142 B2 * | 3/2014 | Shijo | G01S 7/03 342/175 |
| 8,830,133 B2 * | 9/2014 | Weily | H01Q 13/106 343/770 |
| 8,866,687 B2 * | 10/2014 | Biancotto | H01Q 21/064 343/858 |
| 8,970,428 B2 * | 3/2015 | Yano | H01Q 21/0006 342/175 |
| 9,036,026 B2 | 5/2015 | Dellantoni et al. | |
| 9,146,898 B2 | 9/2015 | Ihlenburg et al. | |
| 9,270,028 B2 | 2/2016 | Ruvinsky et al. | |
| 9,575,160 B1 | 2/2017 | Davis et al. | |
| 9,599,702 B1 | 3/2017 | Bordes et al. | |
| 9,612,317 B2 * | 4/2017 | Izadian | H01Q 3/40 |
| 9,689,967 B1 | 6/2017 | Stark et al. | |
| 9,753,121 B1 | 9/2017 | Davis et al. | |
| 9,766,605 B1 * | 9/2017 | Izadian | H01Q 13/10 |
| 10,082,570 B1 * | 9/2018 | Izadian | G01S 13/90 |
| 10,263,310 B2 * | 4/2019 | Kildal | H01P 1/2005 |
| 10,394,204 B1 * | 8/2019 | Izadian | H01Q 21/005 |
| 10,641,867 B2 | 5/2020 | Hess | |
| 11,199,611 B2 | 12/2021 | Wohlte et al. | |
| 2007/0013596 A1 * | 1/2007 | Fukuchi | H01Q 13/10 343/767 |
| 2007/0080878 A1 * | 4/2007 | McLean | H01Q 13/106 343/729 |
| 2010/0245066 A1 | 9/2010 | Sarioglu et al. | |
| 2011/0090129 A1 * | 4/2011 | Weily | H01Q 21/064 343/770 |
| 2011/0187614 A1 * | 8/2011 | Kirino | G01S 7/032 333/239 |
| 2012/0115429 A1 | 5/2012 | Falk | |
| 2013/0169498 A1 * | 7/2013 | Chen | H01Q 13/10 343/770 |
| 2015/0145695 A1 | 5/2015 | Hyde et al. | |
| 2016/0028164 A1 * | 1/2016 | Watanabe | H01Q 21/005 343/771 |
| 2016/0033640 A1 | 2/2016 | De Mersseman et al. | |
| 2016/0084941 A1 | 3/2016 | Arage | |
| 2017/0016980 A1 * | 1/2017 | Chou | H01Q 21/28 |
| 2017/0187124 A1 * | 6/2017 | Kirino | H01Q 13/06 |
| 2017/0194716 A1 * | 7/2017 | Kirino | H01Q 13/06 |
| 2017/0222311 A1 | 8/2017 | Hess et al. | |
| 2017/0237177 A1 * | 8/2017 | Kirino | H01Q 21/0031 343/745 |
| 2017/0254873 A1 | 9/2017 | Koravadi | |
| 2017/0276788 A1 * | 9/2017 | Wodrich | G01S 13/878 |
| 2017/0310004 A1 | 10/2017 | Swirhun et al. | |
| 2017/0315231 A1 | 11/2017 | Wodrich | |
| 2017/0356994 A1 | 12/2017 | Wodrich et al. | |
| 2018/0015875 A1 | 1/2018 | May et al. | |
| 2018/0045812 A1 | 2/2018 | Hess | |
| 2018/0219297 A1 * | 8/2018 | Chen | H01Q 7/00 |
| 2018/0231635 A1 | 8/2018 | Woehlte | |
| 2018/0301817 A1 * | 10/2018 | Ichinose | G01S 13/931 |
| 2018/0301819 A1 * | 10/2018 | Kirino | G01S 1/00 |
| 2019/0006766 A1 * | 1/2019 | Yonei | H01Q 13/16 |
| 2019/0324134 A1 * | 10/2019 | Cattle | H01Q 3/22 |

(56) References Cited

U.S. PATENT DOCUMENTS

2019/0339382 A1   11/2019  Hess et al.
2020/0058987 A1*  2/2020  Pelletti .................. G01S 13/931
2020/0059007 A1*  2/2020  Wang .................... H01Q 13/18

* cited by examiner

| Parameter | Value |
|---|---|
| Substrate $\varepsilon_r$ | 3.152 |
| Substrate loss tangent | 0.0015 |
| Substrate thickness | 0.160 mm |
| Via spacing (center/center) | 0.4 mm |
| Via diameter | 0.1 mm |

FIG. 3

| Parameter | Value |
|---|---|
| l | 2.44 mm |
| w | 0.152 mm |
| l2 | 0.254 mm |
| l1 | 1.093 mm |
| w1 | 0.406 |

FIG. 8

VEHICLE RADAR SYSTEM WITH T-SHAPED SLOT ANTENNAS

CROSS REFERENCE TO RELATED APPLICATIONS

The present application is a continuation of U.S. patent application Ser. No. 16/280,278, filed Feb. 20, 2019, now U.S. Pat. No. 11,199,611, which claims the filing benefits of U.S. provisional application Ser. No. 62/632,695, filed Feb. 20, 2018, which is hereby incorporated herein by reference in its entirety.

FIELD OF THE INVENTION

The present invention relates generally to a vehicle sensing system for a vehicle and, more particularly, to a vehicle sensing system that utilizes one or more radar sensors at a vehicle.

BACKGROUND OF THE INVENTION

Use of imaging and radar sensors in vehicle imaging systems is common and known. Examples of such known systems are described in U.S. Pat. No. 8,013,780, which is hereby incorporated herein by reference in its entirety.

SUMMARY OF THE INVENTION

The present invention provides a driving assistance system or sensing system or control system for a vehicle that utilizes one or more radar sensors to sense regions exterior of the vehicle, with the radar sensor that transmits and receives signals, with the received signals processed to detect the presence of objects at or near the vehicle in the field of sensing of the sensor. The system includes a processor operable to process outputs of the receivers. The radar sensor also includes at least one antenna and at least some of the antennas is based on non-rectangular slot antenna waveguides with the waveguides comprising slots having a longitudinal portion and a transverse portion that extends transverse in at least one direction from the longitudinal portion.

These and other objects, advantages, purposes and features of the present invention will become apparent upon review of the following specification in conjunction with the drawings.

BRIEF DESCRIPTION OF THE DRAWINGS

FIG. 3 is a table of antenna parameters;

FIG. 8 is a table of antenna parameters for a T-shaped slot antenna in accordance with the present invention;

DESCRIPTION OF THE PREFERRED EMBODIMENTS

A vehicle sensing system and/or driver assist system and/or driving assist system and/or object detection system and/or alert system operates to capture sensing data exterior of the vehicle and may process the captured data to detect objects at or near the vehicle and in the predicted path of the vehicle, such as to assist a driver of the vehicle or a control for an autonomous vehicle in maneuvering the vehicle in a forward or rearward direction. The system includes a processor that is operable to receive sensing data from one or more sensors and provide an output, such as an alert or control of a vehicle system.

Figure 1:
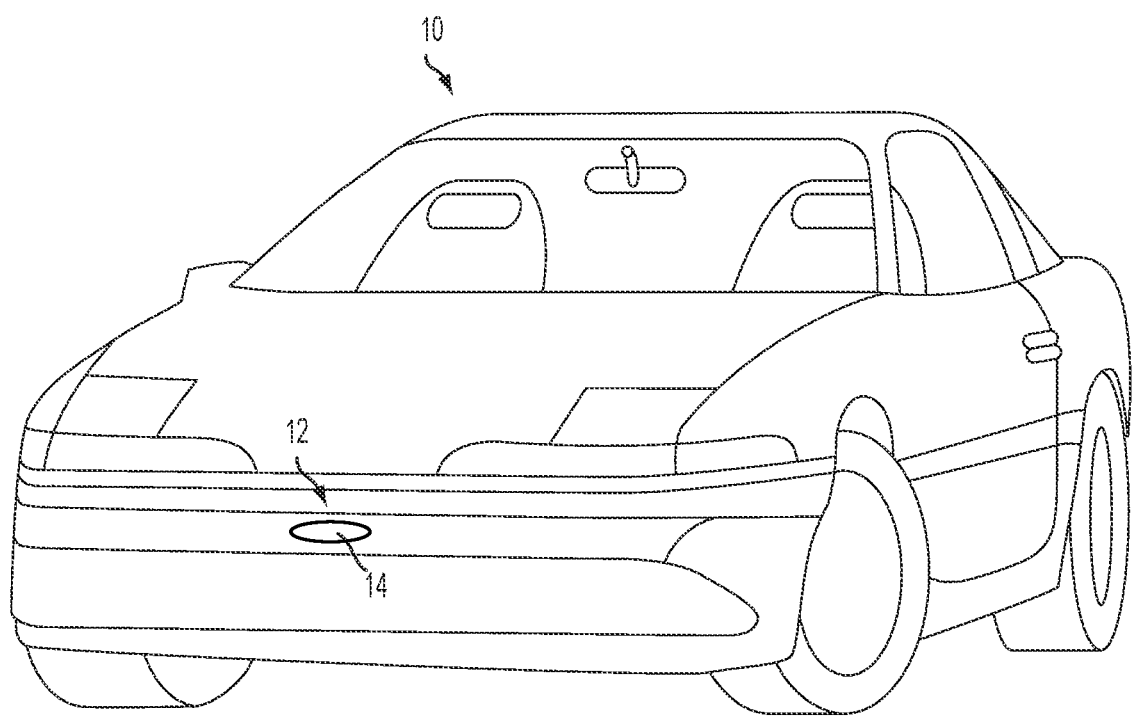
FIG. 1 is a perspective view of a vehicle with a sensing system that incorporates a radar sensor in accordance with the present invention.

Referring now to the drawings and the illustrative embodiments depicted therein, a vehicle 10 (FIG. 1) includes a driving assistance system or sensing system 12 that includes at least one radar sensor unit, such as a forward facing radar sensor unit 14 (and the system may optionally include multiple exterior facing sensors, such as cameras or other sensors, such as a rearward facing sensor at the rear of the vehicle, and a sideward/rearward facing sensor at respective sides of the vehicle), which sense regions exterior of the vehicle. The sensing system 12 includes a control or electronic control unit (ECU) or processor that is operable to process data captured by the sensor or sensors and may detect objects or the like. The data transfer or signal communication from the sensor to the ECU may comprise any suitable data or communication link, such as a vehicle network bus or the like of the equipped vehicle.

Figure 2:
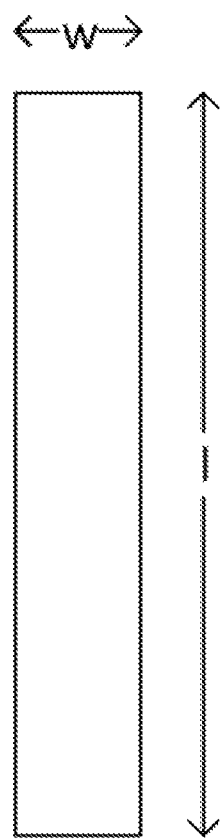
FIG. 2 is a plan view of a classic slot antenna.
Figure 4:
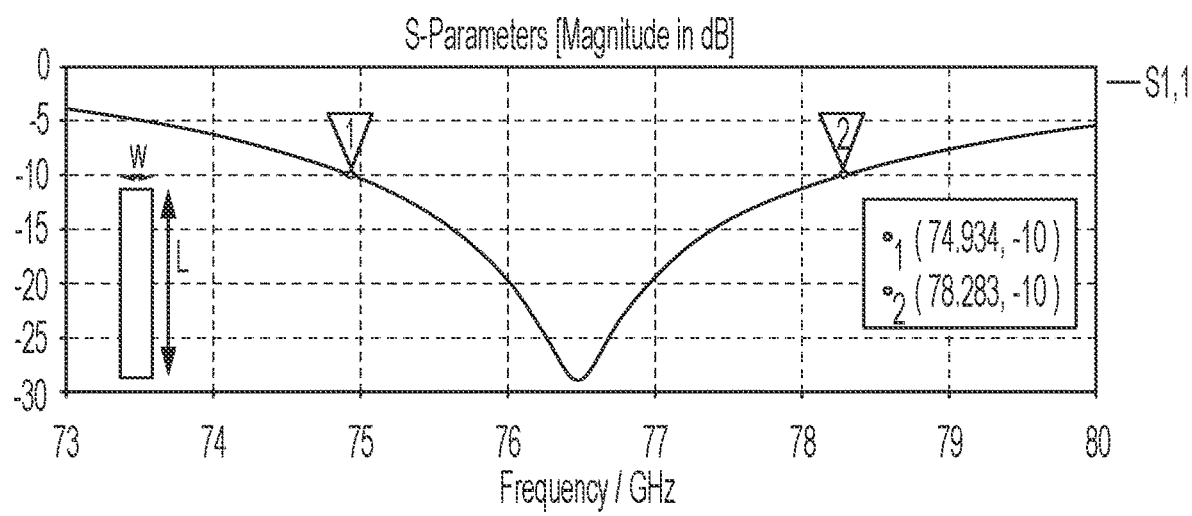
FIG. 4 is a graph of bandwidth of a classic slot antenna.
Figure 5:
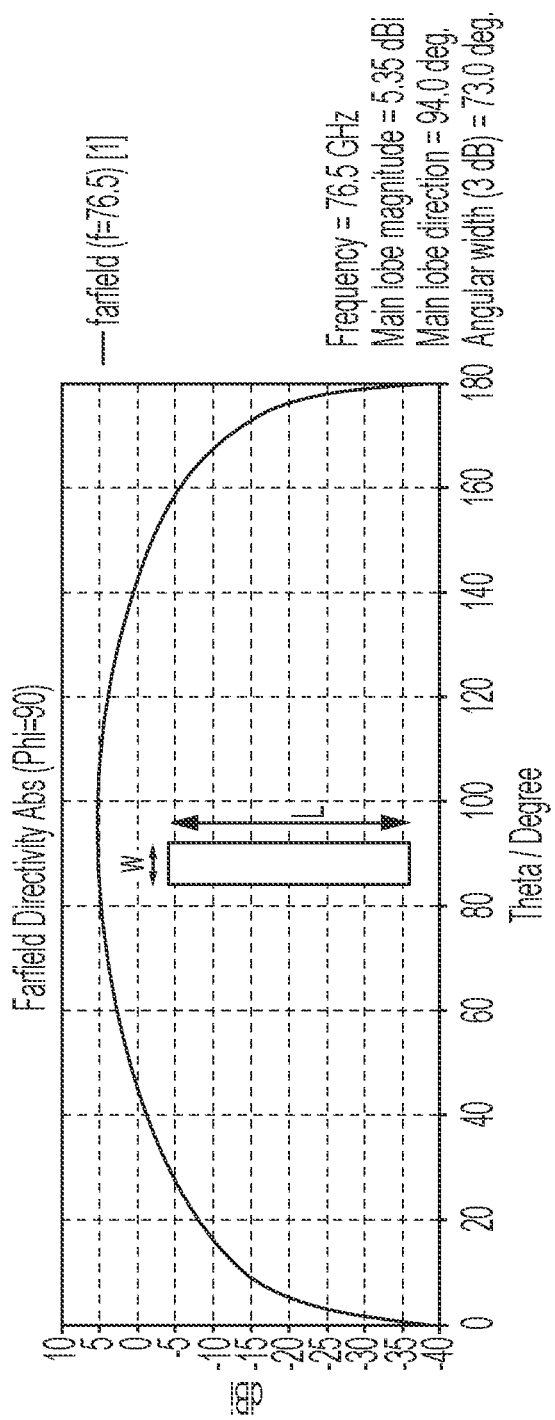
FIG. 5 is a graph of directivity or radiation pattern in elevation of a classic slot antenna.
Figure 6:
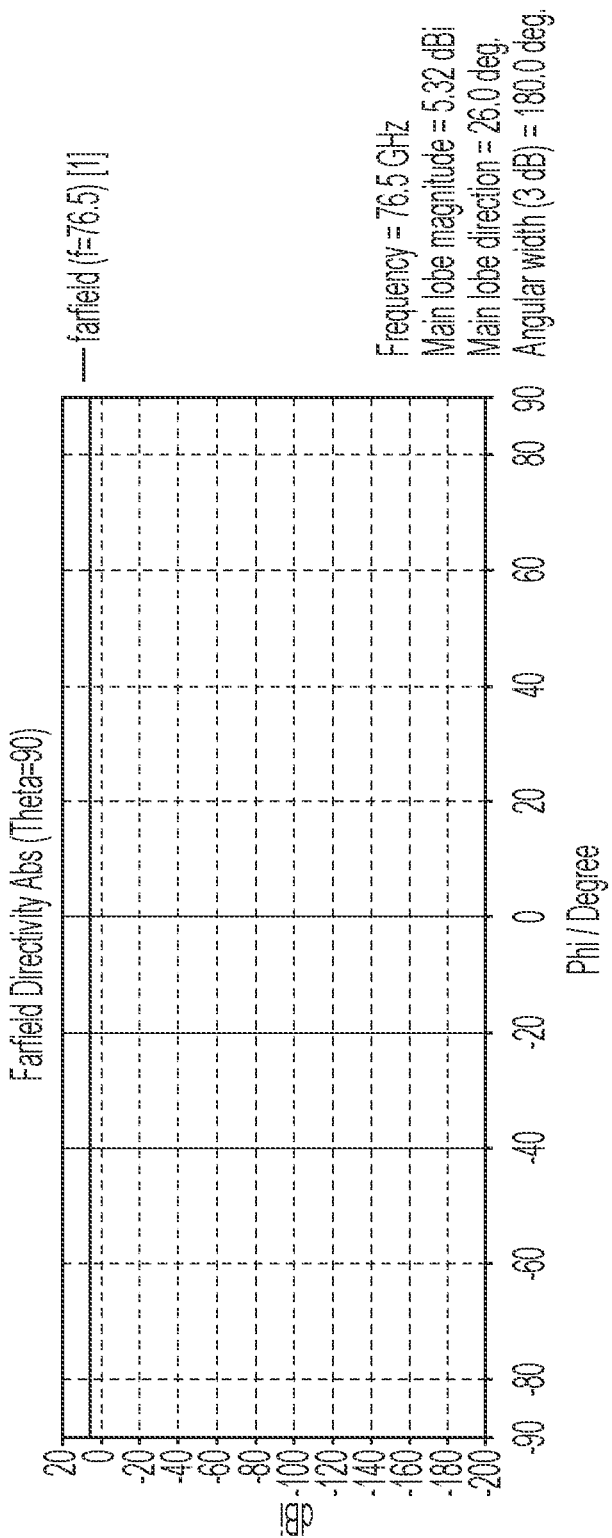
FIG. 6 is a graph of directivity or radiation pattern in azimuth of a classic slot antenna.

Classical or current slot antenna structures are manufactured as or with or in rectangular slots (see FIG. 2). As shown in FIG. 2, l refers to the length of the slot, and w refers to the width of the slot. As shown in FIG. 4, a classic slot antenna with a length of 2.34 mm and a width of 0.152 mm, the input matching is better than −10 dB with a bandwidth of 3.36 GHz (from 74.93 GHz to 78.28 GHz). FIG. 4 represents results of electromagnetic (EM) simulations with additional parameters found in FIG. 3. As shown in FIG. 5, the same classic slot antenna has a 5.35 dB directivity at the antenna boresight. The same classic slot antenna produces an azimuth radiation pattern as shown in FIG. 6.

Figure 7:
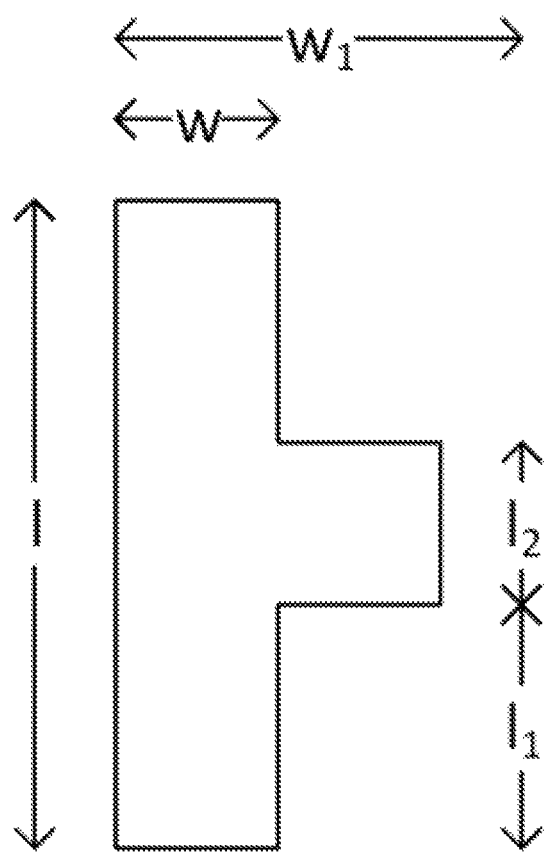
FIG. 7 is a plan view of a T-shaped slot antenna in accordance with the present invention.
Figure 9:
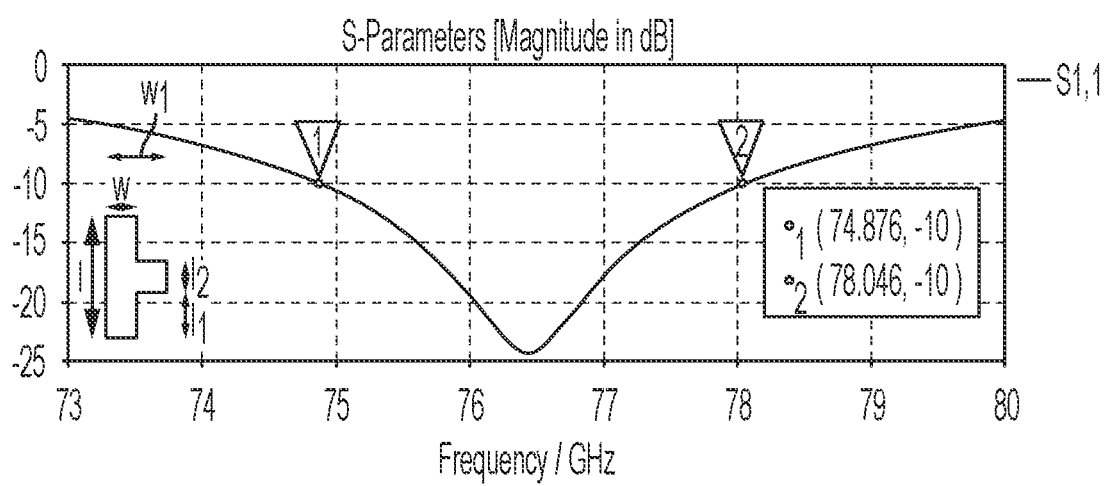
FIG. 9 is a graph of bandwidth of a T-shaped slot antenna in accordance with the present invention.
Figure 10:
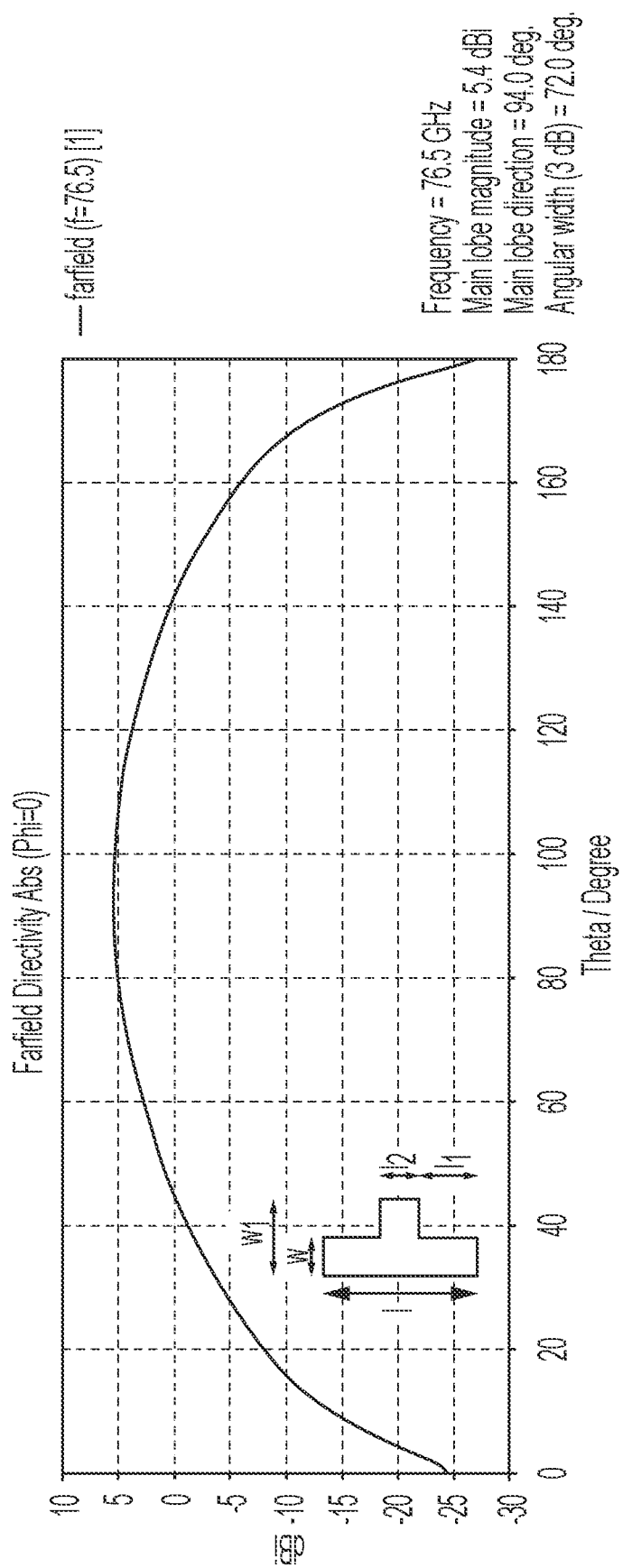
FIG. 10 is a graph of directivity or radiation pattern in elevation of a T-shaped slot antenna in accordance with the present invention.
Figure 11:
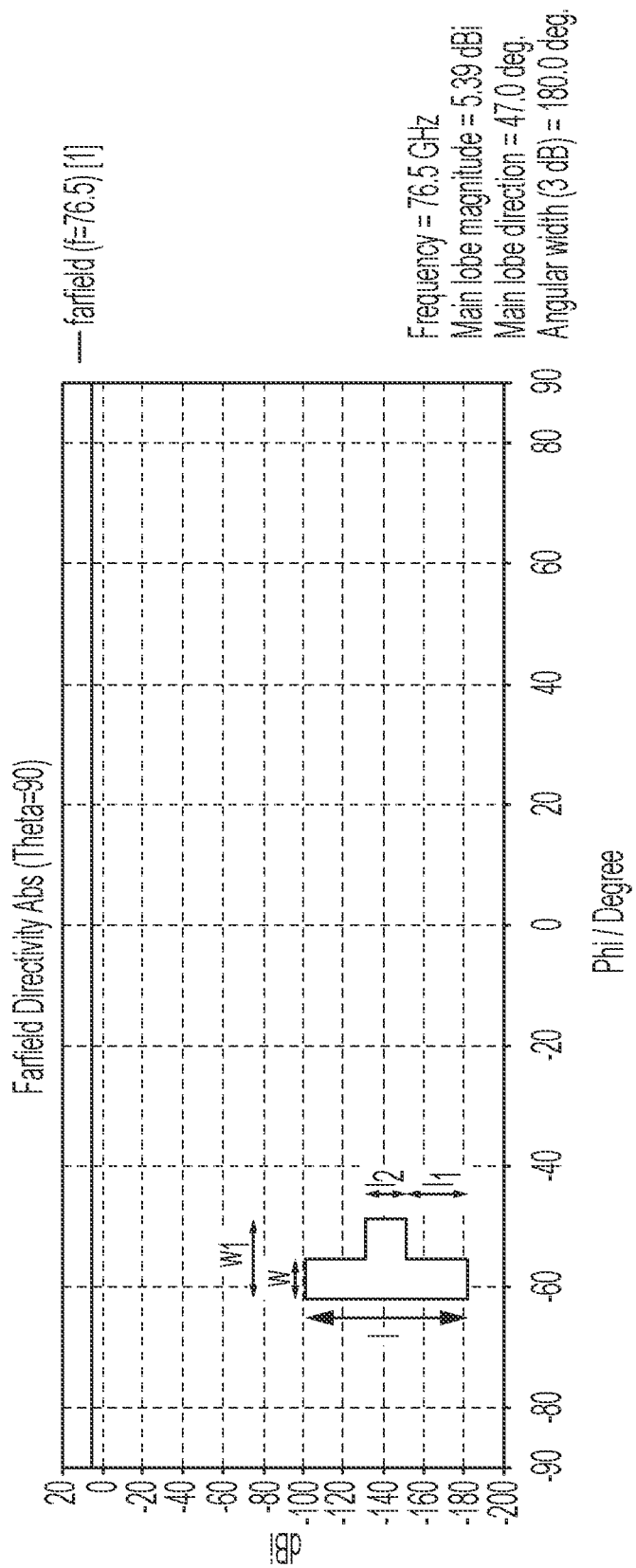
FIG. 11 is a graph of directivity radiation pattern in azimuth of a T-shaped slot antenna in accordance with the present invention.

In accordance with the present invention, a substrate integrated waveguide T-shaped slot antenna (i.e., a radar antenna having a T-shaped or irregular-shaped slot) is provided (see FIG. 7). Such an antenna provides more openings and a reduced antenna matching (e.g., from 3.36 GHz to 3.17 GHz). The T-shaped slot antenna of FIG. 7, when simulated with parameters found in FIG. 8, produces input matching of better than −10 dB with a bandwidth of 3.17 GHz from 74.87 GHz to 78.04 GHz (see FIG. 9). The T-shaped slot antenna, as shown in FIG. 10, produces 5.4 dB directivity at the antenna boresight. The same T-shaped slot antenna produces an azimuth radiation pattern as shown in FIG. 11. Such a T-shaped slot antenna provides more directive radiation pattern than a classic slot antenna.

Figure 12:
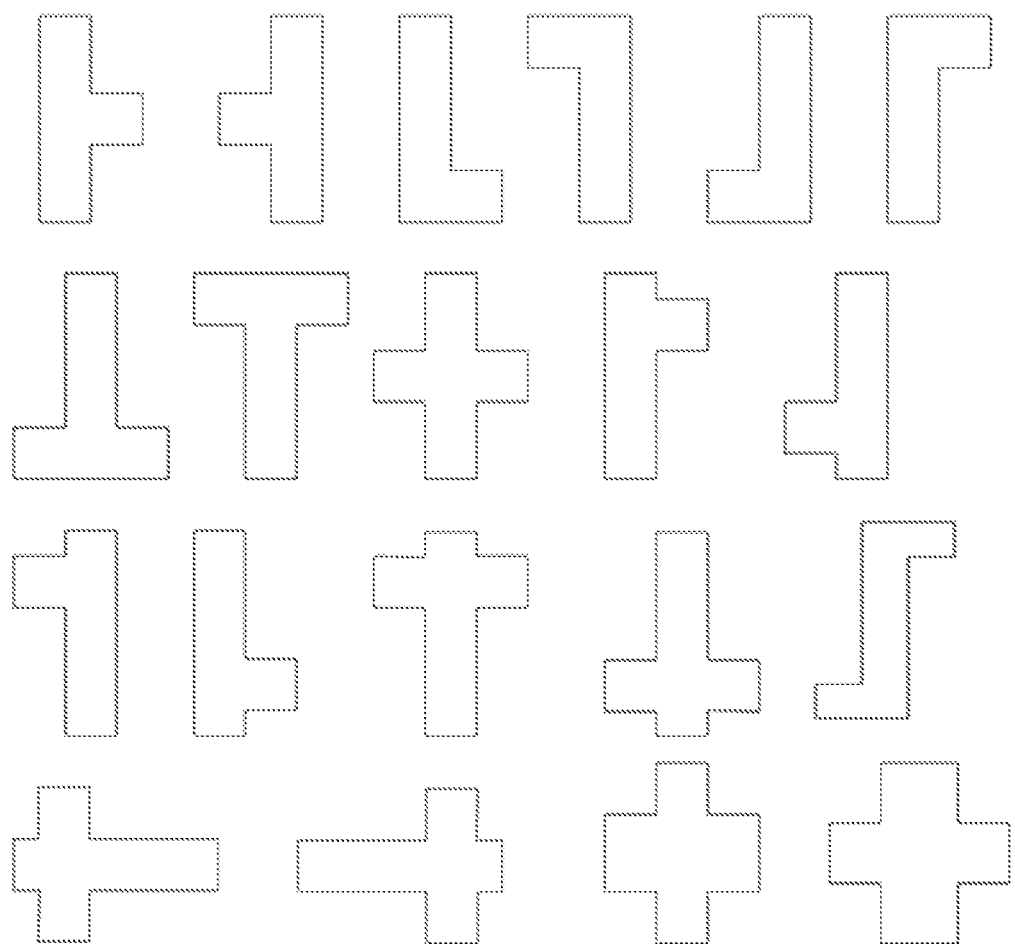
FIG. 12 is a plan view of a variety of T-shaped slot antennas and other alternative shapes.

As used herein, the term "T-shaped slot antenna" is intended to encompass any non-rectangular-shaped slot in an antenna or a waveguide of an antenna, with the slot(s) having a longitudinal portion and a transverse portion that extends transverse in at least one direction from the longitudinal portion. As shown in FIG. 12, the T-shaped slots of the antenna and/or waveguide of the present invention may be formed in a variety of non-rectangular shapes, including generally L-shaped slots and S-shaped or Z-shaped slots and/or the like.

In some examples, the transverse portion of the slot of the non-rectangular slot antenna is centered along the longitudinal portion (FIG. 7). As also illustrated in FIG. 7, the transverse portion may extend transverse in at least two directions from the longitudinal portion. A width of the transverse portion may be greater than a width of the longitudinal portion (FIG. 8). A length of the longitudinal portion may be greater than twice a length of the transverse portion (FIG. 8).

The antenna thus comprises one or more of irregular-shaped slots established along a conductive plate (or optionally at a waveguide of the antenna). The radar signals are emitted through the slots, with the slots affecting a radiation pattern of the antenna. The irregular shape or non-rectangular shape or T-shape of the slots provide enhanced range and function of the radar sensor.

The system may utilize sensors, such as radar or lidar sensors or the like. The sensing system may utilize aspects of the systems described in U.S. Pat. Nos. 9,753,121; 9,689,967; 9,599,702; 9,575,160; 9,146,898; 9,036,026; 8,027,029; 8,013,780; 6,825,455; 7,053,357; 7,408,627; 7,405,812; 7,379,163; 7,379,100; 7,375,803; 7,352,454; 7,340,077; 7,321,111; 7,310,431; 7,283,213; 7,212,663; 7,203,356; 7,176,438; 7,157,685; 6,919,549; 6,906,793; 6,876,775; 6,710,770; 6,690,354; 6,678,039; 6,674,895 and/or 6,587,186, and/or International Publication Nos. WO 2018/007995 and/or WO 2011/090484, and/or U.S. Publication Nos. US-2018-0231635; US-2018-0045812; US-2018-0015875; US-2017-0356994; US-2017-0315231; US-2017-0276788; US-2017-0254873; US-2017-0222311 and/or US-2010-0245066, which are hereby incorporated herein by reference in their entireties.

Changes and modifications in the specifically described embodiments can be carried out without departing from the principles of the invention, which is intended to be limited only by the scope of the appended claims, as interpreted according to the principles of patent law including the doctrine of equivalents.

The invention claimed is:

1. A vehicular radar sensing system, the vehicular radar sensing system comprising:
    a radar sensor configured to be disposed at a vehicle equipped with the vehicular radar sensing system;
    wherein the radar sensor comprises a plurality of antennas;
    wherein the plurality of antennas of the radar sensor comprises a plurality of transmitting antennas that transmit radio signals;
    wherein the plurality of antennas of the radar sensor comprises a plurality of receiving antennas that receive radio signals;
    wherein the radar sensor provides radar data to a processor;
    wherein the processor processes the provided radar data to detect an object present in a field of sensing of the radar sensor; and
    wherein at least some antennas of the plurality of antennas comprise waveguides having T-shaped slots, and wherein each T-shaped slot comprises a longitudinal portion and a transverse portion that extends transverse from the longitudinal portion, and wherein a width of the transverse portion is less than a length of the longitudinal portion.

2. The vehicular radar sensing system of claim 1, wherein each T-shaped slot provides a greater directive radiation pattern than a rectangular slot shaped antenna.

3. The vehicular radar sensing system of claim 1, wherein each T-shaped slot provides reduced antenna matching relative to a rectangular slot shaped antenna.

4. The vehicular radar sensing system of claim 1, wherein at least one transmitting antenna of the plurality of transmitting antennas has a greater than 5 dB directivity at an antenna boresight of the at least one transmitting antenna.

5. The vehicular radar sensing system of claim 1, wherein the transverse portion of each T-shaped slot is centered along the longitudinal portion.

6. The vehicular radar sensing system of claim 1, wherein at least one antenna of the plurality of antennas comprises a waveguide having an S-shaped slot.

7. The vehicular radar sensing system of claim 1, wherein at least one antenna of the plurality of antennas comprises an input matching of greater than −10 dB.

8. The vehicular radar sensing system of claim 1, wherein the transverse portion of each T-shaped slot extends transverse in opposite directions from the longitudinal portion.

9. The vehicular radar sensing system of claim 1, wherein each antenna of the plurality of antennas comprises a substrate integrated antenna.

10. The vehicular radar sensing system of claim 1, wherein the width of the transverse portion of at least one of the T-shaped slots is greater than a width of the longitudinal portion of the at least one of the T-shaped slots.

11. The vehicular radar sensing system of claim 1, wherein the length of the longitudinal portion of at least one of the T-shaped slots is greater than twice a length of the transverse portion.

12. The vehicular radar sensing system of claim 1, wherein the processor is part of a driving assist system of the vehicle, and wherein, with the radar sensor disposed at the vehicle, the driving assist system controls at least one function of the vehicle responsive to the processor processing the provided radar data.

13. A vehicular radar sensing system, the vehicular radar sensing system comprising:
    a radar sensor configured to be disposed at a vehicle equipped with the vehicular radar sensing system;
    wherein the radar sensor comprises a plurality of antennas;
    wherein the plurality of antennas of the radar sensor comprises a plurality of transmitting antennas that transmit radio signals;
    wherein the plurality of antennas of the radar sensor comprises a plurality of receiving antennas that receive radio signals;
    wherein the radar sensor provides radar data to a processor;
    wherein the processor processes the provided radar data to detect an object present in a field of sensing of the radar sensor;
    wherein at least some antennas of the plurality of antennas comprise waveguides having T-shaped slots, and wherein each T-shaped slot comprises a longitudinal portion and a transverse portion that extends transverse from the longitudinal portion, and wherein a width of the transverse portion is less than a length of the longitudinal portion;

wherein the transverse portion of each T-shaped slot is centered along the longitudinal portion; and wherein the processor is part of a driving assist system of the vehicle, and wherein, with the radar sensor disposed at the vehicle, the driving assist system controls at least one function of the vehicle responsive to the processor processing the provided radar data.

14. The vehicular radar sensing system of claim 13, wherein the transverse portion of each T-shaped slot extends transverse in opposite directions from the longitudinal portion.

15. The vehicular radar sensing system of claim 13, wherein each antenna of the plurality of antennas comprises a substrate integrated antenna.

16. The vehicular radar sensing system of claim 13, wherein the width of the transverse portion of at least one of the T-shaped slots is greater than a width of the longitudinal portion of the at least one of the T-shaped slots.

17. The vehicular radar sensing system of claim 13, wherein the length of the longitudinal portion of at least one of the T-shaped slots is greater than twice a length of the transverse portion of the at least one of the T-shaped slots.

18. A vehicular radar sensing system, the vehicular radar sensing system comprising:

a radar sensor configured to be disposed at a vehicle equipped with the vehicular radar sensing system;

wherein the radar sensor comprises a plurality of antennas;

wherein the plurality of antennas of the radar sensor comprises a plurality of transmitting antennas that transmit radio signals;

wherein the plurality of antennas of the radar sensor comprises a plurality of receiving antennas that receive radio signals;

wherein the radar sensor provides radar data to a processor;

wherein the processor processes the provided radar data to detect an object present in a field of sensing of the radar sensor;

wherein at least some antennas of the plurality of antennas comprise waveguides having T-shaped slots, and wherein each T-shaped slot comprises a longitudinal portion and a transverse portion that extends transverse from the longitudinal portion, and wherein a width of the transverse portion is less than a length of the longitudinal portion;

wherein the length of the longitudinal portion of at least one of the T-shaped slots is greater than twice a length of the transverse portion of the at least one of the T-shaped slots; and wherein the processor is part of a driving assist system of the vehicle, and wherein, with the radar sensor disposed at the vehicle, the driving assist system controls at least one function of the vehicle responsive to the processor processing the provided radar data.

19. The vehicular radar sensing system of claim 18, wherein the transverse portion of each T-shaped slot extends transverse in opposite directions from the longitudinal portion.

20. The vehicular radar sensing system of claim 18, wherein each antenna of the plurality of antennas comprises a substrate integrated antenna.

\* \* \* \* \*